(12) United States Patent
Park et al.

(10) Patent No.: US 9,971,066 B2
(45) Date of Patent: May 15, 2018

(54) POLARIZING PLATE

(71) Applicant: LG Chem, LTD., Seoul (KR)

(72) Inventors: Kwang-Seung Park, Daejeon (KR);
Hae-Sung Cho, Daejeong (KR);
Hyun-Hee Son, Daejeon (KR);
Nam-Jeong Lee, Daejeong (KR);
Jun-Wuk Park, Daejeon (KR);
Eun-Soo Huh, Daejeon (KR); Mi-Rin Lee, Daejeon (KR); Sung-Hyun Jeon, Daejeon (KR)

(73) Assignee: LG Chem, Ltd, Seoul (KR)

( * ) Notice: Subject to any disclaimer, the term of this patent is extended or adjusted under 35 U.S.C. 154(b) by 255 days.

(21) Appl. No.: 14/389,672

(22) PCT Filed: Jun. 26, 2014

(86) PCT No.: PCT/KR2014/005702
§ 371 (c)(1),
(2) Date: Sep. 30, 2014

(87) PCT Pub. No.: WO2015/046720
PCT Pub. Date: Apr. 2, 2015

(65) Prior Publication Data
US 2016/0003983 A1    Jan. 7, 2016

(30) Foreign Application Priority Data

Sep. 30, 2013  (KR) .................. 10-2013-0117006
Jun. 3, 2014   (KR) .................. 10-2014-0067773

(51) Int. Cl.
*G02B 5/30* (2006.01)
*G02B 1/04* (2006.01)
*G02B 1/14* (2015.01)
*G02F 1/1335* (2006.01)

(52) U.S. Cl.
CPC ............... *G02B 1/14* (2015.01); *G02B 1/04* (2013.01); *G02B 5/3033* (2013.01)

(58) Field of Classification Search
USPC ........ 428/1.31, 1.5, 1.6; 359/483.01; 349/96
See application file for complete search history.

(56) References Cited

U.S. PATENT DOCUMENTS

| 8,344,083 | B2 | 1/2013 | Um et al. |
| 9,261,728 | B2 * | 2/2016 | Kuroda .............. G02F 1/133528 |
| 2005/0209358 | A1 * | 9/2005 | Miller ............... C08F 222/1006 |
| | | | 522/113 |
| 2009/0257012 | A1 * | 10/2009 | Sabae .................. G02B 5/3033 |
| | | | 349/118 |
| 2013/0093982 | A1 | 4/2013 | Kuroda et al. |
| 2013/0303649 | A1 | 11/2013 | Ichiryu et al. |

FOREIGN PATENT DOCUMENTS

| CN | 103237827 A | 8/2013 |
| JP | 03-188102 A | 8/1991 |
| JP | 2000-230016 A | 8/2000 |
| JP | 2001-151814 A | 6/2001 |
| JP | 2002-120326 A | 4/2002 |
| JP | 2010-204622 A | 9/2010 |
| KR | 10-2009-0115040 A | 11/2009 |
| TW | 201314315 A | 4/2013 |

OTHER PUBLICATIONS

TW Office Action, Application No. 103122603, dated Nov. 10, 2015.

* cited by examiner

*Primary Examiner* — Tae H Yoon
(74) *Attorney, Agent, or Firm* — Dentons US LLP

(57) ABSTRACT

The present disclosure relates to a polarizing plate including: a polarizer; and a protective layer formed on at least one surface of the polarizer, wherein the protective layer is formed of a composition for a polarizing plate protective layer, including a curable compound, a non-curable polymer, and a polymerization initiator, the curable compound being at least one selected from a group consisting of a compound including a functional group containing at least one of O, N and F atoms and having an ethylenically unsaturated bond and a ring-opening polymerizable compound, and the non-curable polymer including a functional group containing at least one of O, N and F atoms in a side chain thereof.

21 Claims, No Drawings

POLARIZING PLATE

This application is a National Stage Application of International Patent Application No. PCT/KR2014/005702, filed on Jun. 26, 2014, and claims the benefit of Korean Patent Application Nos. 10-2013-0117006, filed on Sep. 30, 2013 and 10-2014-0067773, filed on Jun. 3, 2014, in the Korean Intellectual Property Office, all of which are incorporated herein by reference in their entirety.

TECHNICAL FIELD

The present disclosure relates to a polarizing plate and more particularly, to a polarizing plate manufactured using a composition for a polarizing plate protective layer, having a low degree of curing shrinkage and superior thermal stability and optical properties.

BACKGROUND ART

Polarizing plates according to the related art generally have a structure in which protective films are attached to both surfaces of a polarizer formed of a polyvinyl alcohol (hereinafter, referred to as 'PVA')-based resin dyed with a dichroic dye or iodine, using an adhesive. However, as of late, as the thinning of display devices has proceeded, the development of single-sided polarizing plates respectively including a protective film only formed on one surface of a polarizer and a bonding layer directly formed on the other surface of the polarizer, without the protective film, has been undertaken. However, in the case of single-sided polarizing plates including the bonding layer directly formed on the polarizer as described above, since durability thereof may be defective, cracks may be easily generated in the polarizer under severe conditions. Further, curling may be caused due to a difference in shrinkage rates between the protective film and the bonding layer, thereby leading to a light leakage phenomenon in the case that the polarizing plate is mounted on a display device.

In order to solve the limitations as described above, a technology of forming a protective layer between a polarizer and a bonding layer of a single-sided polarizing plate using a cationically curable resin or a radically curable resin has been suggested. However, in the case of protective layer formation compositions suggested to date, since all monomers, oligomers, or polymers contained in the composition include curable reactive groups, the curing shrinkage thereof may be significantly high, and consequently, the protective layer may shrink during a curing process of the protective layer, leading to curling, thereby degrading structural stability of the polarizing plate. Meanwhile, in order to reduce degrees of curing shrinkage of protective layer formation compositions, a method of blending polymers having no curable reactive groups or inorganic substances in a solid state such as carbon block or the like may be considered. However, in the case of blending inorganic substances in a solid state, defects such as coloring, light scattering and the like may be caused, such that optical properties may tend to be easily deteriorated. In the case of blending polymers having no curable reactive groups, due to a double Tg phenomenon in which two or more glass transition temperatures of a composition are caused, thermal stability may be degraded.

Thus, the development of a protective layer for a protective plate, having a low degree of curing shrinkage, as well as superior thermal stability and optical properties, has been demanded.

DISCLOSURE

Technical Problem

An aspect of the present disclosure provides a polarizing plate including a protective layer having a low degree of curing shrinkage while not inhibiting thermal stability and optical properties of the polarizing plate.

Technical Solution

According to an aspect of the present disclosure, there is provided a polarizing plate including: a polarizer; and a protective layer formed on at least one surface of the polarizer, wherein the protective layer is formed of a composition for a polarizing plate protective layer, including a curable compound, a non-curable polymer, and a polymerization initiator, the curable compound being at least one selected from a group consisting of a compound including a functional group containing at least one of O, N and F atoms and having an ethylenically unsaturated bond and a ring-opening polymerizable compound, and the non-curable polymer including a functional group containing at least one of O, N and F atoms in a side chain thereof.

The composition for the polarizing plate protective layer may include: 70 to 98.5 parts by weight of the curable compound, the curable compound being at least one selected from the group consisting of the compound including the functional group containing at least one of O, N and F atoms and having the ethylenically unsaturated bond and the ring-opening polymerizable compound; 1 to 20 parts by weight of the non-curable polymer including the functional group containing at least one of O, N and F atoms in the side chain thereof; and 0.5 to 10 parts by weight of the polymerization initiator.

The functional group containing at least one of O, N and F atoms may be at least one selected from a group consisting of a hydroxyl group, an amine group, an amide group, a urethane group, a carboxyl group, an acid anhydride group, an oxazoline group, and a fluorine group.

In addition, the compound including the functional group containing at least one of O, N and F atoms and having the ethylenically unsaturated bond may be an acrylic compound, a vinylic compound or combinations thereof, for example, a hydroxy (meth)acrylate-based monomer, a hydroxy (meth)acrylate-based oligomer, a carboxylic (meth)acrylate-based monomer, a carboxylic (meth)acrylate-based oligomer, an acrylamide-based monomer, an acrylamide-based oligomer, a urethane (meth)acrylate-based monomer, a urethane (meth)acrylate oligomer, an acid anhydride-based (meth)acrylate monomer, an acid anhydride-based (meth)acrylate oligomer, an oxazoline-based (meth)acrylate monomer, an oxazoline-based (meth)acrylate oligomer, a vinyl pyrrolidone-based monomer, a vinyl pyrrolidone-based oligomer, an acryloyl morpholine-based monomer, an acryloyl morpholine-based oligomer, or combinations thereof. For example, the compound including the functional group containing at least one of O, N and F atoms and having the ethylenically unsaturated bond may be at least one selected from a group consisting of compounds represented by the following Chemical Formulae.

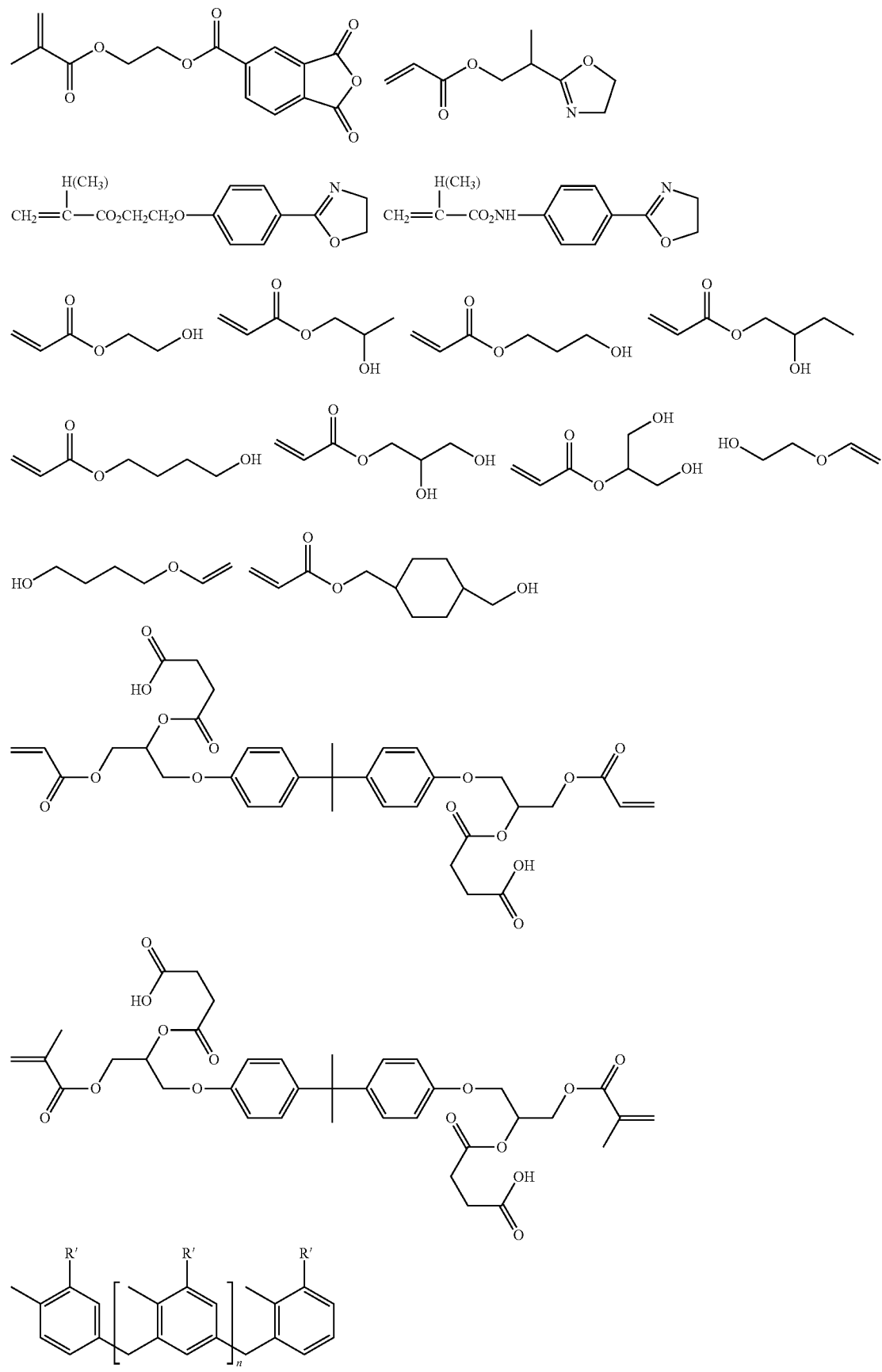

5
(where, R' is
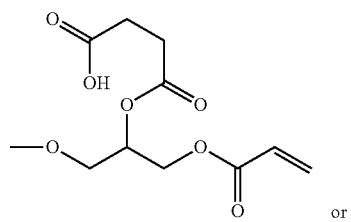 or
6
-continued
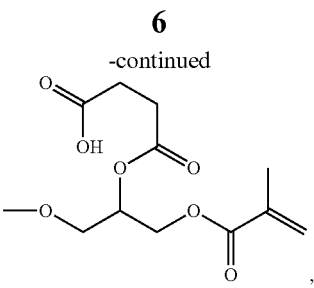,
and n is an integer of 1 to 5)
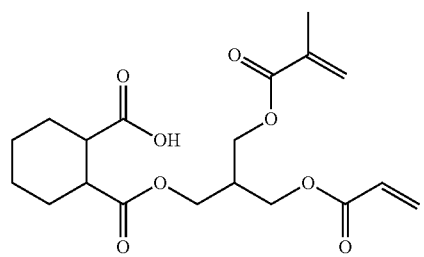
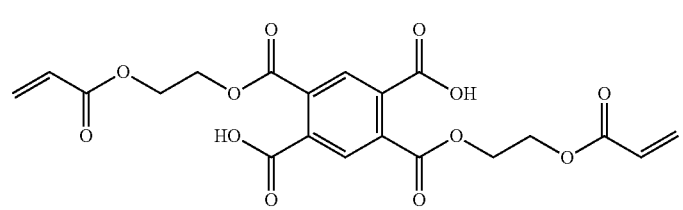
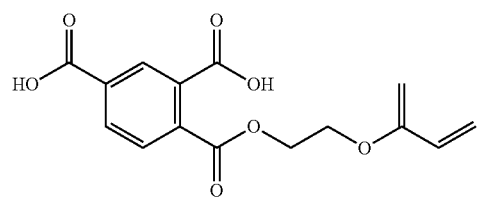
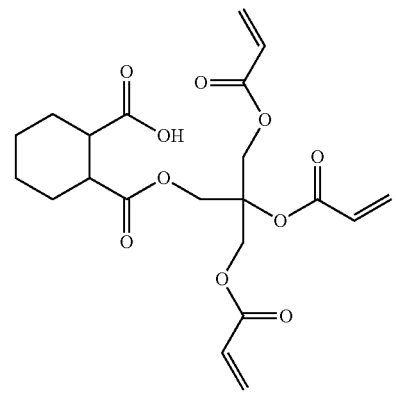
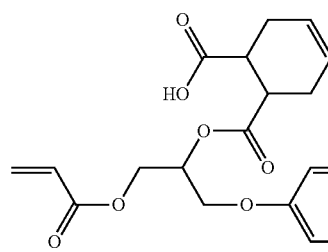
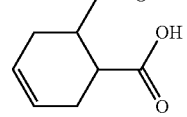
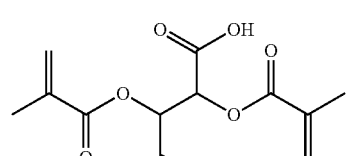  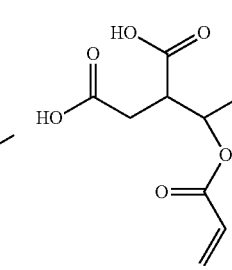  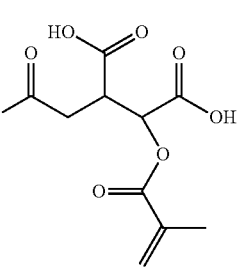  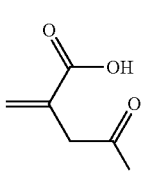

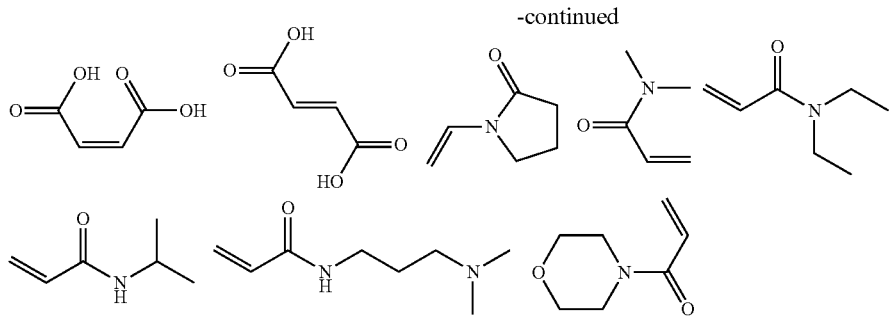

Meanwhile, the ring-opening polymerizable compound may be an epoxy compound, an oxetane compound or combinations thereof but may not be limited thereto. For example, the ring-opening polymerizable compound may be an aromatic epoxy compound, a hydrogenated epoxy compound, an alicyclic epoxy compound, an aliphatic epoxy compound, an oxetane compound or combinations thereof.

Next, the non-curable polymer including the functional group containing at least one of O, N and F atoms in the side chain thereof may be at least one selected from a group consisting of a vinyl alcohol-based polymer or copolymer, a acrylic acid-based polymer or copolymer, a vinyl pyrrolidone-based polymer or copolymer, a vinyl acetate-based polymer or copolymer, an amide-based polymer or copolymer, a vinylidene fluoride-based polymer or copolymer, and a urethane-based polymer or a copolymer. The polymerization initiator may be a cationic polymerization initiator, a radical polymerization initiator, or combinations thereof.

Meanwhile, according to an exemplary embodiment of the present disclosure, a degree of curing shrinkage of the composition for the polarizing plate protective layer at a temperature of 20° C. may be 7% to 13%. A glass transition temperature of the composition for the polarizing plate protective layer may be 60° C. to 200° C. A viscosity of the composition for the polarizing plate protective layer may be 30 cP to 500 cP.

The polarizing plate according to an exemplary embodiment of the present disclosure may further include a protective film attached to a surface of the polarizer, opposite to the surface thereof on which the protective layer is formed, via an adhesive layer, if necessary. The polarizing plate according to an exemplary embodiment of the present disclosure may further include a bonding layer formed on the protective layer. In this case, the protective film may be a cellulose film, a polyethylene terephthalate (PET) film, a cycloolefin polymer (COP) film, or an acrylic film.

According to another aspect of the present disclosure, there is provided a display device including: the polarizing plate as described above.

Advantageous Effects

Since a protective layer composition used in exemplary embodiments of the present disclosure may include a curable component together with a non-curable polymer and thus, may have a low degree of curing shrinkage, a curling phenomenon in a polarizing plate occurring at the time of curing the protective layer may be significantly reduced.

In addition, in the case of a polarizing plate according to an exemplary embodiment of the present disclosure, since a curable compound and a non-curable polymer are in a hydrogen-bonded state in the protective layer, double glass transition temperatures (tgs) may not be caused and stable thermal characteristics may be provided.

BEST MODE

Hereinafter, exemplary embodiments of the present disclosure will be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research in order to resolve the problem of shrinkage defects occurring in the curing of a polarizing plate protective layer, the inventors of the disclosure found that in the case of forming a protective layer using a composition including a curable compound and a non-curable polymer hydrogen bondable to the curable compound, a degree of curing shrinkage of the protective layer may be reduced while thermal characteristics and optical properties of the polarizing plate may not be inhibited, and then completed the disclosure.

More specifically, a polarizing plate according to an exemplary embodiment of the present disclosure may include a polarizer and a protective layer provided on at least one surface of the polarizer, wherein the protective layer is formed of a composition for a polarizing plate protective layer, including (1) a curable compound, (2) a non-curable polymer and (3) a polymerization initiator.

In this case, (1) the curable compound may be at least one selected from a group consisting of a compound having an ethylenically unsaturated bond and a ring-opening polymerizable compound. In this case, the compound having an ethylenically unsaturated bond may include a functional group containing at least one of O, N and F atoms. In a case in which the compound having the ethylenically unsaturated bond includes the functional group as described above, it may be hydrogen bonded to (2) the non-curable polymer, thereby implementing stable thermal properties. In the ring-opening polymerizable compound, in the majority of cases, since a functional group containing O, N and/or F atoms may be generated after a ring-opening reaction, the ring-opening polymerizable compound may not require a separate functional group for forming a hydrogen bond. However, if necessary, the ring-opening polymerizable compound may also include a functional group containing O, N and/or F atoms.

Meanwhile, the functional group containing at least one of O, N and F atoms is not limited to but may be at least one selected from a group consisting of a hydroxyl group, an amine group, an amide group, a urethane group, a carboxyl group, an acid anhydride group, an oxazoline group, and a fluorine group.

Meanwhile, the compound including the functional group containing at least one of O, N and F atoms and having the ethylenically unsaturated bond may be an acrylic compound, a vinylic compound or combinations thereof, for example, a hydroxy(meth)acrylate-based monomer, a hydroxy(meth) acrylate-based oligomer, a carboxylic (meth)acrylate-based monomer, a carboxylic (meth)acrylate-based oligomer, an acrylamide-based monomer, an acrylamide-based oligomer, a urethane (meth)acrylate-based monomer, a urethane (meth)acrylate oligomer, an acid anhydride-based (meth) acrylate monomer, an acid anhydride-based (meth)acrylate oligomer, an oxazoline-based (meth)acrylate monomer, an oxazoline-based (meth)acrylate oligomer, a vinyl pyrrolidone-based monomer, a vinyl pyrrolidone-based oligomer, an acryloyl morpholine-based monomer, an acryloyl morpholine-based oligomer, or combinations thereof, but is not limited thereto.

Meanwhile, in order to adjust a viscosity of the composition prior to a curing process and to adjust a glass transition temperature of the composition after the curing process, two or more types of compounds may be mixed with each other and be used as the compound having the ethylenically unsaturated bond. For example, in the case that as the compound having the ethylenically unsaturated bond, a combination of an acrylamide-based compound and an acrylate-based compound including the functional group containing at least one of O, N and F atoms or a combination of a vinyl pyrrolidone-based compound and an acrylate-based compound including the functional group containing at least one of O, N and F atoms is used, the viscosity of the composition prior to the curing process may be lowered and improved workability may be obtained and after the curing process, a high glass transition temperature may be implemented.

More specifically, the compound having the ethylenically unsaturated bond may be at least one selected from a group consisting of, for example, compounds represented by the following Chemical Formulae.

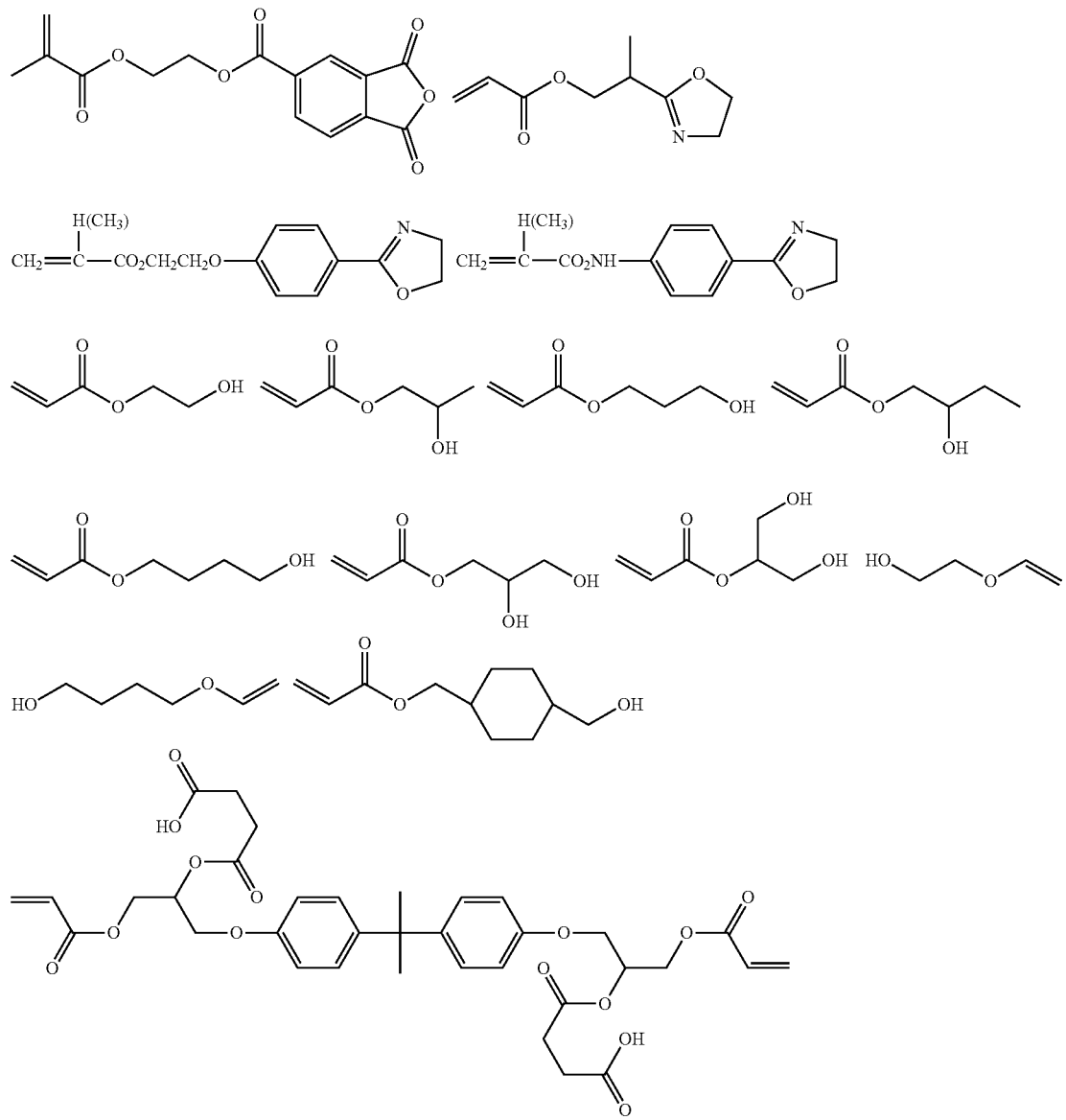

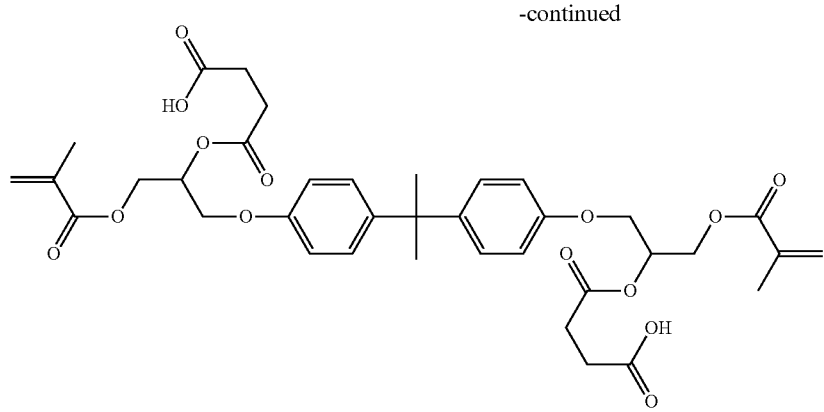
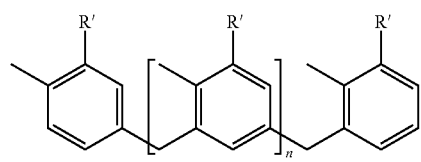
(where, R' is
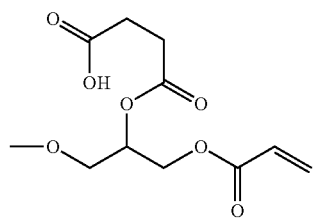 or 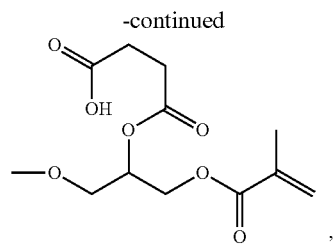
and n is an integer of 1 to 5)
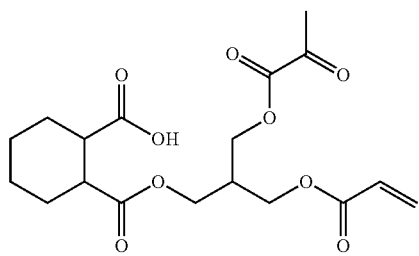
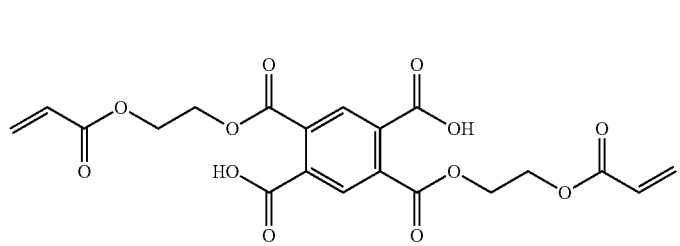
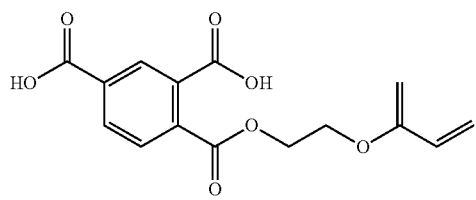
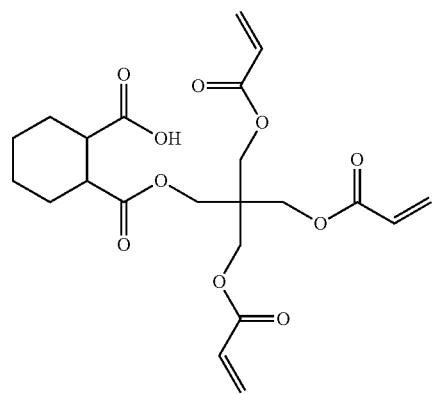

-continued

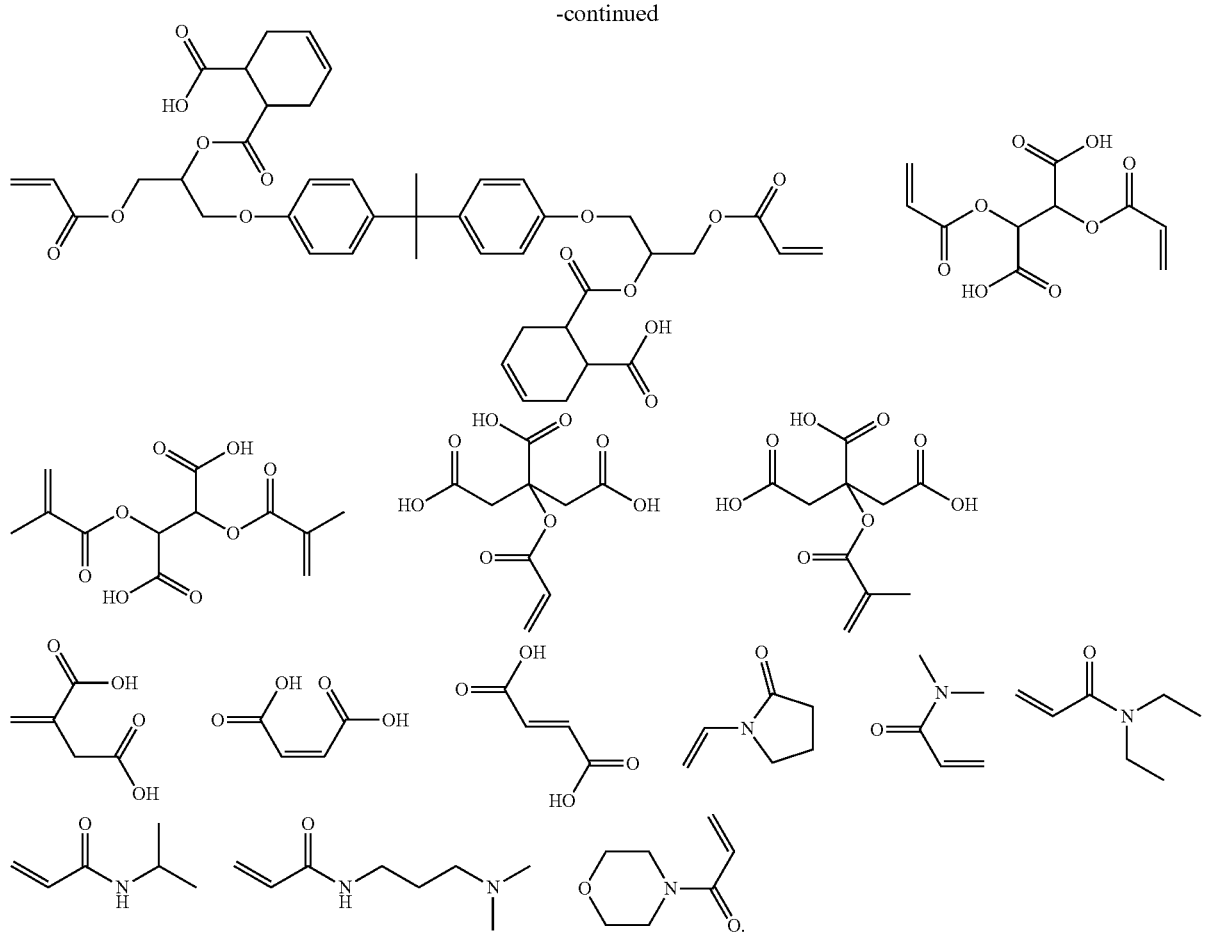

Next, the ring-opening polymerizable compound may be an epoxy compound, an oxetane compound or combinations thereof, but is not limited thereto. For example, the ring-opening polymerizable compound may be an aromatic epoxy compound, a hydrogenated epoxy compound, an alicyclic epoxy compound, an aliphatic epoxy compound, an oxetane compound or combinations thereof.

Meanwhile, in order to adjust the viscosity of the composition prior to the curing process and to adjust the glass transition temperature of the composition after the curing process, two or more types of compounds may be mixed with each other and be used as the ring-opening polymerizable compound. For example, in the case that as the ring-opening polymerizable compound, a combination of the alicyclic epoxy compound, the aliphatic epoxy compound, and the oxetane compound is used, the viscosity of the composition prior to the curing process may be lowered and improved workability may be obtained and after the curing process, a high glass transition temperature may be implemented.

In this case, the aromatic epoxy compound refers to an epoxy compound containing at least one aromatic hydrocarbon ring within a molecule, and examples thereof are not limited to but may be a bisphenol type epoxy resin such as bisphenol A diglycidyl ether, bisphenol F diglycidyl ether, or bisphenol S diglycidyl ether; a novolac type epoxy resin such as a phenol novolac epoxy resin, a cresol novolac epoxy resin or a hydroxybenzaldehyde phenolnovolac epoxy resin; a polyfunctional epoxy resin such as glycidyl ether of tetrahydroxyphenyl methane, glycidyl ether of tetrahydroxybenzophenone, or epoxidized polyvinyl phenol; or the like.

In addition, the hydrogenated epoxy compound refers to an epoxy compound obtained by selectively performing a hydriding reaction on the aromatic epoxy compound in the presence of a catalyst under pressurization conditions, and examples thereof are not limited but thereamong, preferably, may be hydrogenated bisphenol A diglycidyl ether.

In addition, the alicyclic epoxy compound refers to an epoxy compound in which an epoxy group is formed between two carbon atoms adjacent to each other and configuring an aliphatic hydrocarbon ring, and examples thereof are limited to but may include 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinylcyclohexane dioxide, bis(3,4-epoxycyclohexylmethyl)adipate, bis(3,4-epoxy-6-methylcyclohexylmethyl)adipate, exo-exo bis(2,3-epoxy cyclopentyl)ether, endo-exo bis(2,3-epoxy cyclopentyl)ether, 2,2-bis[4-(2,3-epoxypropoxyl)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxyl)hexahydro-4,7-methanoindan, p-(2,3-epoxy)cyclopentylphenyl-2,3-epoxypropylether, 1-(2,3-epoxypropoxyl)phenyl-5,6-epoxyhexahydro-4,7-methanoindan, o-(2,3-epoxy)cyclopentylphenyl-2,3-epoxypropylether, 1,2-bis[5-(1,2-epoxy)-4,7-hexahydro methanoindanokisil]ethane cyclopentenylphenylglycidylether, methylene bis(3,4-epoxycyclohexane)ethylene glycol, d(3,4-epoxycyclohexylmethyl)ether, ethylene bis(3,4-epoxycyclohexanecarboxylate), 3,4-epoxycyclohexane methanol ε-caprolactone(1-10 moles) adducts, esterified compounds of polyvalent (3 to 20 values) alcohol (GR, TMP, PE, DPE, hexapentaerythritol) and the like. Among these, in particular, 3,4-epoxycyclohexylmethyl-3,4-epoxycyclohexanecarboxylate may preferably be used.

Meanwhile, the aliphatic epoxy compound refers to an epoxy compound containing an aliphatic chain or an aliphatic ring within a molecule and examples thereof are not limited to but may include 1,4-cyclohexanedimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylolpropane triglycidyl ether, n-butyl glycidyl ether, 2-ethylhexyl glycidyl ether and the like.

Meanwhile, the oxetane compound refers to a compound containing at least one oxetanyl group within a molecule, and examples thereof are not limited but may include 3-ethyl-3-[(3-ethyloxetane-3-y)methoxymethyl]oxetane, 1,4-bis[(3-ethyloxetane-3-y)methoxymethyl]benzene, 1,4-bis[(3-ethyloxetane-3-y)methoxy]benzene, 1,3-bis[(3-ethyloxetane-3-y)methoxy]benzene, 1,2-bis[(3-ethyloxetane-3-y)methoxy]benzene, 4,4'-bis[(3-ethyloxetane-3-y)methoxy]biphenyl, 2,2'-bis[(3-ethyloxetane-3-y)methoxy]biphenyl, 3,3',5,5'-tetramethyl-4,4'-bis[(3-ethyloxetane-3-y)methoxy]biphenyl, 2,7-bis[(3-ethyloxetane-3-y)methoxy]naphthalene, bis[4-{(3-ethyloxetane-3-y)methoxy}phenyl]methane, bis[2-{(3-ethyloxetane-3-y)methoxy}phenyl]methane, 2,2-bis[4-{(3-ethyloxetane-3-y)methoxy}phenyl]propane, esterified products of a novolac phenol formaldehyde resin due to 3-chloromethyl-3-ethyloxetane, 3(4), 8(9)-bis[(3-ethyloxetane-3-yl)methoxymethyl]-tricyclo[5.2.1.0 2,6]decane, 2,3-bis[(3-ethyloxetane-3-yl)methoxymethyl]norbornane, 1,1,1-tris[(3-ethyloxetane-3-yl)methoxy methyl] propane, 1-butoxy-2,2-bis[(3-ethyloxetane-3-yl) methoxymethyl]butane, 1,2-bis{[2-(3-ethyloxetane-3-yl) methoxy}ethylthio}ethane, bis[{4-(3-ethyloxetane-3-yl) methylthio}phenyl]sulfide, 1,6-bis[(3-ethyloxetane-3-yl) methoxy]-2,2,3,3,4,4,5,5-octafluorohexane and the like.

Meanwhile, the curable compound as described above may be included in an amount of approximately 70 to 98.5 parts by weight, preferably approximately 80 to 98.5 parts by weight, more preferably approximately 80 to 90 parts by weight, with respect to the total weight of the composition for the polarizing plate protective layer. When the content of the curable compound is less than 70 parts by weight, the viscosity of the composition may be increased, whereby film formation may be difficult. When the content of the curable compound is greater than 98.5 parts by weight, an effect of a decrease in curing shrinkage may be insignificant.

Next, (2) the non-curable polymer refers to a component for decreasing the curing shrinkage rate of the protective layer, refers to a polymer including no functional group generating a double bond or a curing reaction, such as an epoxy group. Meanwhile, the non-curable polymer used in an exemplary embodiment of the present disclosure may be characterized by including a functional group containing at least one of O, N and F atoms in a side chain thereof. As in an exemplary embodiment of the present disclosure, in a case in which such a functional group is included in the side chain of the non-curable polymer, the non-curable polymer may form a hydrogen bond with (1) the curable compound and consequently, the overall composition may have a single glass transition temperature, such that thermal characteristics of the protective layer may be stably maintained.

The functional group containing at least one of O, N and F atoms in the side chain of the non-curable polymer is not limited to, but may be at least one selected from a group consisting of, for example, a hydroxyl group, an amine group, an amide group, a urethane group, a carboxyl group, an acid anhydride group, an oxazoline group and a fluorine group.

A concrete example of the non-curable polymer usable in an exemplary embodiment of the present disclosure may be a vinyl alcohol-based polymer or copolymer, a acrylic acid-based polymer or copolymer, a vinyl pyrrolidone-based polymer or copolymer, a vinyl acetate-based polymer or copolymer, an amide-based polymer or copolymer, a vinylidene fluoride-based polymer or copolymer, a urethane-based polymer or a copolymer, or the like. The respective polymers may be used alone or in a combination of at least two thereof.

In this case, the vinyl alcohol-based polymer or copolymer may include a repeating unit represented by the following Chemical Formula 1.

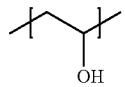

[Chemical Formula 1]

The acrylic acid-based polymer or copolymer may include a repeating unit represented by the following Chemical Formula 2.

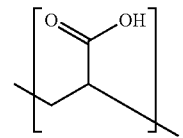

[Chemical Formula 2]

The vinyl pyrrolidone-based polymer or copolymer may include a repeating unit represented by the following Chemical Formula 3.

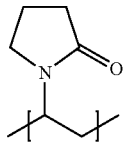

[Chemical Formula 3]

The vinyl acetate-based polymer or copolymer may include a repeating unit represented by the following Chemical Formula 4.

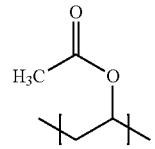

[Chemical Formula 4]

The amide-based polymer or copolymer may include a repeating unit represented by the following Chemical Formula 5.

[Chemical Formula 5]

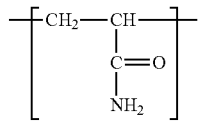

The vinylidene fluoride-based polymer or copolymer may include a repeating unit represented by the following Chemical Formula 6.

[Chemical Formula 6]

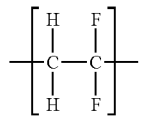

The urethane-based polymer or a copolymer may include a repeating unit represented by the following Chemical Formula 7.

[Chemical Formula 7]

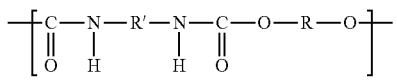

In [Chemical Formula 7], R and R' are each independently indicate alkyl, cycloalkyl, aryl or the like.

Meanwhile, the non-curable polymer may be included in an amount of approximately 1 to 20 parts by weight, preferably approximately 1 to 15 parts by weight, more preferably approximately 1 to 10 parts by weight, with respect to the total weight of the composition for the polarizing plate protective layer. When the content of the non-curable polymer is less than 1 part by weight, an effect of decrease in the curing shrinkage may be insignificant. When the content of the non-curable polymer is greater than 15 parts by weight, the viscosity of the composition may be increased, whereby film formation may be difficult.

Next, the polymerization initiator may be provided to accelerate a curing reaction of the curable compound. Depending on types of the curable compound used, an appropriate polymerization initiator may be used. For example, in a case in which the curable compound is a radically curable compound such as acrylate, a radical initiator may be used. In a case in which the curable compound is a cationically curable compound such as epoxy, a cationic initiator may be used. The radical initiator and the cationic initiator may be used together.

In this case, as the radical initiator, any radical initiator commonly used in the technical field may be used without limitation. For example, the radical initiator may be at least one selected from a group consisting of 1-hydroxy-cyclohexyl-phenyl-ketone, 2-hydroxy-2-methyl-1-phenyl-1-propanone, 2-hydroxy-1-[4-(2-hydroxyethoxyl)phenyl]-2-methyl-1-propanone, methylbenzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, phosphine oxide, and phenylbis(2,4,6-trimethyl benzoyl).

Meanwhile, the cationic initiator may include, for example, sulfonium salts or iodonium salts. The cationic initiator including sulfonium salts or iodonium salts may be at least one selected from a group consisting of, for example, diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium)dihexafluoroantimonate and (thiodi-4,1-phenylene)bis(diphenylsulfonium)dihexafluorophosphate, but is not limited thereto.

Meanwhile, the polymerization initiator may be included in an amount of approximately 0.5 to 10 parts by weight, preferably approximately 1 to 5 parts by weight, more preferably approximately 2 to 4 parts by weight, with respect to the total weight of the composition for the polarizing plate protective layer. When the content of the polymerization initiator is less than 0.5 parts by weight, a curing speed may be lowered, such that properties of the film may be degraded. When the content of the polymerization initiator is greater than 10 parts by weight, optical properties of the polarizing plate may be deteriorated due to unreacted portions of the polymerization initiator.

Meanwhile, a degree of curing shrinkage of the composition for the polarizing plate protective layer, configured of the constitutions as described above, at a temperature of 20° C., may be approximately 7% to 13%. In this case, the degree of curing shrinkage refers to a rate of change in volumes of the protective layer composition, both prior to and after the curing thereof, with respect to the volume of the protective layer composition prior to the curing thereof, and may be calculated by the following Formula (1), $$\text{curing shrinkage } (\%) = \{(V_i - V_f)/V_i\} \cdot 100 \quad \text{Formula (1)}$$
$$= \{((m/\rho_i) - V_f)/(m/\rho_i)\} \cdot 100$$

where, $V_i$ refers to a volume of the protective layer composition prior to the curing thereof, $V_f$ refers to a volume of the protective layer composition after the curing thereof, m refers to a weight of the protective layer composition, and $\rho_i$ refers to density of the protective layer composition prior to the curing thereof.

In addition, a glass transition temperature of the composition for the polarizing plate protective layer may be approximately 60° C. to 200° C. When the glass transition temperature of the composition for the polarizing plate protective layer satisfies the numerical range, a polarizing plate having excellent heat resistance properties may be manufactured.

In addition, a viscosity of the composition for the polarizing plate protective layer may be approximately 30 cP to 500 cP. When the viscosity of the composition for forming the protective layer satisfies the numerical range, film formation may be facilitated through a general coating process.

In a case in which the protective layer is formed using the protective layer composition (also referred to as "composition for forming the protective layer") as described above, since the curing shrinkage of the protective layer may be low, the occurrence of curling may be reduced and superior optical properties and thermal characteristics may be exhibited.

Meanwhile, the polarizing plate according to an exemplary embodiment of the present disclosure may be manufactured by a method of forming the protective layer by performing curing after applying the protective layer composition as described above to at least one surface of the polarizer. In this case, the applying of the protective layer composition may be performed by coating methods commonly known in the technical field, such as a spin coating method, a bar coating method, a roll coating method, a gravure coating method and the like, for example. In addition, the curing may be performed by irradiating active energy rays such as ultraviolet rays, electron beams or the like.

Meanwhile, the polarizer is not particularly limited, but a polarizer commonly known in the technical field, for example, a film formed of polyvinyl alcohol containing iodine or dichromatic dyes, may be used. The polarizer may be manufactured by dyeing a PVA film with iodine or dichromatic dyes, but a manufacturing method thereof is not particularly limited.

Meanwhile, the polarizing plate according to an exemplary embodiment of the present disclosure may further include a protective film attached to one surface of the polarizer via an adhesive layer. In this case, the protective film may preferably be attached to a surface of the polarizer on which the protective layer is not formed, but the present disclosure is not limited thereto.

Meanwhile, the adhesive layer may be formed using various types of adhesive for a polarizing plate, commonly known in the technical field, for example, a polyvinyl alcohol adhesive, an acrylic adhesive, an epoxy adhesive, a urethane adhesive or the like. More specifically, after the adhesive as described above is applied to one surface of the protective film or the polarizer, the polarizer and the protective film are laminated and subsequently, the adhesive may be cured by applying heat or active energy rays thereto, whereby the protective film may be attached to the polarizer.

Meanwhile, as the protective film, a protective film formed of various materials generally known in the technical field, for example, a cellulose film, a polyethylene terephthalate (PET) film, a cycloolefin polymer (COP) film, an acrylic film or the like may be used without limitation. Among these, the acrylic film may be preferably used in consideration of optical characteristics, durability, economic feasibility and the like.

In this case, the acrylic protective film may contain a (meth)acrylate resin and for example, may be obtained by extruding a forming material containing a (meth)acrylate resin as a main component.

The acrylic protective film may be a film including a copolymer having an alkyl(meth)acrylate unit and a styrene unit, and an aromatic resin having a carbonate moiety in a main chain thereof, or a film including an alkyl(meth)acrylate unit, a styrene unit, a 3 to 6-membered heterocyclic unit substituted with at least one carbonyl group, and a vinyl cyanide unit.

Alternatively, the acrylic protective film may be a film including a (meth)acrylate resin having an aromatic ring. An example of the (meth)acrylate resin having the aromatic ring is a resin composition described in Korean Patent Laid Open Publication No. 10-2009-0115040. The disclosed resin composition includes: (a) a (meth)acrylate unit including one or more (meth)acrylate derivatives; (b) an aromatic unit including a chain having a hydroxyl-containing moiety and an aromatic moiety; and (c) a styrene unit including one or more styrene derivatives. Units (a) to (c) may be included in the resin composition as separate copolymers, or two or more of units (a) to (c) may be included in the resin composition as a single copolymer.

Alternatively, the acrylic protective film may be a film including an acrylic resin having a lactone ring structure. A concrete example of the (meth)acrylate resin having the lactone ring structure is described in Japanese Patent Laid Open Publication No. 2000-230016, Japanese Patent Laid Open Publication No. 2001-151814, Japanese Patent Laid Open Publication No. 2002-120326, and the like.

A method of manufacturing the acrylic protective film is not particularly limited, but the acrylic protective film may be manufactured in such a manner that a (meth)acrylate resin, a polymer, an additive, and the like are sufficiently mixed with one another through any appropriate mixing method to manufacture a thermoplastic resin composition and the composition is then formed as a film, or may be manufactured in such a manner that a (meth)acrylate resin, a polymer, an additive, and the like are fabricated as separate solutions and mixed with one another to form a uniform mixture solution and the mixture solution is then formed as a film.

The thermoplastic resin composition may be manufactured by extrusion-kneading a mixture obtained by free-blending raw materials of the film, using an appropriate blender such as an Omni blender or the like. In this case, the blender used in the extrusion-kneading is not particularly limited, and for example, an appropriate blender including an extruder such as a single screw extruder or a double screw extruder, a pressing kneader or the like may be used therefor.

A method of forming the film may be any appropriate method of forming a film, such as a solution casting method (solution emulsifying method), a melt extrusion method, a calendaring method, a compressive molding method or the like. Among the foregoing film forming methods, the solution casting method (solution emulsifying method) and the melt extrusion method may be preferable.

Examples of a solvent used in the solution casting method (solution emulsifying method) may include: aromatic hydrocarbons such as benzene, toluene, xylene, and the like; aliphatic hydrocarbons such as cyclohexane, decalin, and the like; esters such as acetic acid ethyl, acetic acid butyl and the like; ketones such as acetone, methyl ethyl ketone, methyl isobutyl ketone, and the like; alcohols such as methanol, ethanol, isopropanol, butanol, isobutanol, methyl cellosolve, ethyl cellosolve, butyl cellosolve, and the like; ethers such as tetrahydrofuran, dioxane, and the like; halogenated hydrocarbons such as dichloromethane, chloroform, carbon tetrachloride, and the like; dimethylformamide; dimethyl sulfoxide, and the like. These solvents may be used alone or in combinations of two or more thereof.

Examples of an apparatus for performing the solution casting method (solution emulsifying method) may include a drum type casting machine, a band type casting machine, a spin coater, and the like. Examples of the melt extrusion method may include a T-die method, an inflation method, and the like. A forming temperature may be 150 to 350° C. and preferably, may be 200 to 300° C.

In the case of forming the film using the T-die method, a T-die is mounted on a front edge of a single screw extruder or a double-screw extruder and a film extruded to have a film shape is rolled to thereby obtain a roll-shaped film. In this case, the rolled film may be stretched in an extruding direction and thus, may be uniaxially stretched by appropriately adjusting a temperature of the rolled film. In addition, the film is stretched in a direction perpendicular to the extruding direction, such that simultaneous biaxial stretching and sequential biaxial stretching thereof and the like may be performed.

The acrylic protective film may be a non-stretched film or a stretched film. In the case of the stretched film, the stretched film may be a uniaxially stretched film or a biaxially stretched film. In the case of the biaxially stretched film, the biaxially stretched film may be a simultaneously biaxially stretched film or a sequentially biaxially stretched film. In the case in which the film is biaxially stretched, mechanical strength thereof may be enhanced and performance of the film may be improved. The acrylic film may be mixed with other thermoplastic resins, such that an increase in phase differences may be suppressed even in the case of stretching the film, and optical isotropy thereof may be maintained.

A stretching temperature may be within a range around a glass transition temperature of the thermoplastic resin composition, a raw material of the film. The stretching temperature may preferably be within a range of (glass transition temperature−30° C.) to (glass transition temperature+100° C.), more preferably, within a range of (glass transition temperature−20° C.) to (glass transition temperature+80° C.). When the stretching temperature is lower than (glass transition temperature−30° C.), a sufficient stretching ratio may not be obtained. On the other hand, when the stretching temperature is greater than (glass transition temperature+100° C.), the flow of the resin composition may occur, such that stable stretching may not be carried out.

A stretching ratio defined by an area ratio may be preferably 1.1 to 25 times, more preferably 1.3 to 10 times. When the stretching ratio is lower than 1.1 times, improvements in toughness, accompanied with the stretching may not be obtained. When the stretching ratio is greater than 25 times, an effect according to an increase in stretching ratio may be insufficient.

A stretching speed in one direction may be 10 to 20,000%/min, preferably, 100 to 10,000%/min. When the stretching speed is less than 10%/min, a relatively long period of time is required in order to obtain a sufficient stretching ratio, causing an increase in manufacturing costs. When the stretching speed is greater than 20,000%/min, breakages of the stretched film may occur.

The acrylic protective film may be subjected to a thermal treatment (annealing) or the like after the stretching thereof in order to stabilize optical isotropy or mechanical properties thereof. Conditions for the thermal treatment are not particularly limited, and any appropriate conditions commonly known in the art may be employed.

Meanwhile, a surface treatment for improvements in adhesive strength may be performed with respect to the acrylic protective film, if necessary. For example, at least one surface treatment selected from a group consisting of an alkali treatment, a corona treatment, and a plasma treatment may be performed on at least one surface of an optical film.

Meanwhile, the polarizing plate according to an exemplary embodiment of the present disclosure may further include a bonding layer on the protective layer in order to be attached to an optical film such as a display panel or a retardation film, if necessary.

In this case, the bonding layer may be formed by using various bonding agents commonly known in the technical field, and types of the bonding agents are not particularly limited. For example, the bonding layer may be formed using a rubber bonding agent, an acrylic bonding agent, a silicon bonding agent, a urethane bonding agent, a polyvinyl alcohol bonding agent, a polyvinyl pyrrolidone bonding agent, a polyacrylamide bonding agent, a cellulose bonding agent, a vinyl alkyl ether bonding agent or the like. Among these, the bonding layer may particularly preferably be formed using an acrylic bonding agent in terms of transparency and heat resistance properties and the like.

Meanwhile, the bonding layer may be formed by a method of applying a bonding agent to an upper portion of the protective layer or may be formed by a method of attaching a bonding sheet fabricated by drying a bonding agent after applying the bonding agent to a release sheet, to the upper portion of the protective layer.

A thickness of the bonding layer is not limited but may be approximately 1 μm to 50 μm, preferably approximately 5 μm to 40 μm, more preferably approximately 10 μm to 30 μm.

The polarizing plate according to an exemplary embodiment of the present invention may be usefully applied to an optical device such as a liquid crystal display, or the like. For example, the optical device may be a liquid crystal display including a liquid crystal panel and polarizing plates disposed on both surfaces of the liquid crystal panel. In this case, at least one of the polarizing plates may be the polarizing plate according to an exemplary embodiment of the present invention. In this case, types of the liquid crystal panel included in the liquid crystal display are not particularly limited. For example, types of panels are limited and for example, a passive matrix panel such as a twisted nematic (TN) type panel, a super twisted nematic (STN) type panel, a ferroelectric (F) type panel, or a polymer dispersed (PD) type panel; an active matrix panel such as a two terminal type panel or a three terminal type panel; an in-plane switching (IPS) panel; and a vertical alignment (VA) panel may all be used. Also, types of other components constituting the liquid crystal display, for example, types of upper and lower substrates (i.e. color filter substrate or array substrate) are not particularly limited, and components commonly known in the art may be employed without any limitation.

MODE FOR DISCLOSURE

Hereinafter, exemplary embodiments of the present disclosure will be described in detail through examples.

Inventive Example 1—Protective Layer Composition A

Protective Layer Composition A was prepared by mixing 47 g of 2-hydroxyethyl acrylate, 45 g of normal vinyl pyrrolidone, 5 g of a polyvinyl alcohol resin (Gohsefimer Z-100 manufactured by Nippon Synthetic Chemical Industry Co., Ltd), and 3 g of Igarcure 819 and subsequently, heating the mixture at 90° C.

Inventive Example 2—Protective Layer Composition B

Protective Layer Composition B was prepared by mixing 47 g of 2-hydroxyethyl acrylate, 30 g of dimethyl acrylamide (DMAA), 20 g of polyvinylpyrrolidone (PVP K-15 manufactured by ISP), and 3 g of Igarcure 819 and subsequently, heating the mixture at 90° C.

Inventive Example 3—Protective Layer Composition C

Protective Layer Composition C was prepared by mixing 47 g of 2-hydroxyethyl acrylate, 40 g of dimethyl acrylamide (DMAA), 10 g of polyurethane (CPU0320 manufactured by Chokwang Paint Co., Ltd), and 3 g of Igarcure 819 and subsequently, heating the mixture at 90° C.

Inventive Example 4—Protective Layer Composition D

Protective Layer Composition D was prepared by mixing 47 g of 2-hydroxyethyl acrylate, 40 g of dimethyl acrylamide (DMAA), 10 g of a polyacrylate resin (Catalog Item No. 323667 by Sigma-Aldrich Company), and 3 g of Igarcure 819 and subsequently, heating the mixture at 90° C. under low humidity conditions (humidity: 20% or less).

Inventive Example 5—Protective Layer Composition E

Protective Layer Composition E was prepared by mixing 20 g of Celloxide 2021P (3'-4'-Epoxycyclohexane)methyl 3'-4'-epoxycyclohexyl-carboxylate)(by Daicel Chemical Industries), 20 g of cyclohexanedimethanol diglycidyl ether, 45 g of oxt-221(3-ethyl-3-{[(3-ethyloxetane-3-yl)methoxy]methyl}oxetane)(by Toagosei. Co., Ltd.), 10 g of a polyacrylate resin (Catalog Item No. 323667 by Sigma-Aldrich Company), and 5 g of UVI-6992 triarylsulfonium hexafluorophosphate (by Dow Chemical Company) and subsequently, heating the mixture at 60° C.

Comparative Example 1—Protective Layer Composition F

Protective Layer Composition F was prepared by mixing 52 g of 2-hydroxyethyl acrylate, 45 g of normal vinyl pyrrolidone and 3 g of Igarcure 754.

Comparative Example 2—Protective Layer Composition G

Protective Layer Composition G was prepared by mixing 47 g of 2-hydroxyethyl acrylate, 40 g of normal vinyl pyrrolidone, 10 g of a polymethyl methacrylate resin (LG MMA HP-202), and 3 g of Igarcure 754 and subsequently, heating the mixture at 90° C.

Experimental Example 1

With regard to the protective layer compositions A to G prepared according to Inventive Examples 1 to 5 and Comparative Examples 1 to 2, curing shrinkage rates at a temperature 20° C., glass transition temperatures and viscosities were measured by the following methods. The measured results are described in the following [Table 1].

(1) Curing Shrinkage: A volume Vi corresponding to 1 g of each of the protective layer compositions A to G prepared according to Inventive Examples 1 to 5 and Comparative Examples 1 to 2 was measured using an automatic gas pycnometer. Next, after the protective layer compositions were respectively applied to releasing PET films and were cured thereon, the correspondingly formed protective layers were separated therefrom. After a volume Vf of each of the separated protective layers was measured using the automatic gas pycnometer, the curing shrinkage rates of the protective layers were calculated using the above Formula (1).

(2) Glass Transition Temperature: by obtaining pieces of the cured protective layers, the glass transition temperatures thereof were measured using a Differential Scanning calorimeter (DCS manufactured by Mettler Toledo). The scanning was performed two times at a scanning rate of 10° C. per minute within a measurement temperature range of −30° C. to 200° C., and the measured glass transition temperatures were values of glass transition temperatures obtained at the time of performing the second scanning.

(3) Viscosity: The viscosities of the protective layer compositions A to G prepared according to Inventive Examples 1 to 5 and Comparative Examples 1 to 2 were measured using a Viscometer TV-22 (Toki Sangyo) at 25° C.

TABLE 1

| Classification | Curing Shrinkage (%) | Glass Transition Temperature (° C.) | Viscosity (cP) |
| --- | --- | --- | --- |
| Inventive Example 1 | 12.3 | 80° C. | 250 |
| Inventive Example 2 | 9.8 | 78° C. | 120 |
| Inventive Example 3 | 11.5 | 76° C. | 40 |
| Inventive Example 4 | 11.8 | 88° C. | 70 |
| Inventive Example 5 | 6.8 | 103° C. | 55 |
| Comparative Example 1 | 14.6 | 81° C. | 10 |
| Comparative Example 2 | 13.4 | 7° C. and 99° C. | 100~600 (non-uniformly measured) |

As indicated above in Table 1, it could be confirmed that the compositions of Comparative Examples 1 and 2 had curing shrinkage rates greater than those of Inventive Examples 1 to 5, the composition of Comparative Example 1 had a significantly low viscosity, such that film formation could be difficult, and the composition of Comparative Example 2 had double Tg values and was unsuitable for manufacturing a polarizing plate having excellent heat resistance properties.

While the present disclosure has been shown and described in connection with the embodiments, it will be apparent to those skilled in the art that modifications and variations can be made without departing from the scope of the invention as defined by the appended claims.

The invention claimed is:

1. A composition for forming a protective layer for a polarizing plate, the composition comprising:
    a curable compound, a non-curable polymer, and a polymerization initiator,
    the curable compound being at least one selected from a group consisting of: (i) a compound including a functional group selected from a group consisting of a hydroxyl group, an amine group, an amide group, a urethane group, a carboxyl group, an acid anhydride group, an oxazoline group, and a fluorine group and comprising an ethylenically unsaturated bond; and (ii) a ring-opening polymerizable compound, and
    the non-curable polymer including a functional group containing at least one of O, N and F atoms in a side chain thereof,
    wherein the curable compound is present in an amount of 70 to 98.5 parts by weight, with respect to the total weight of the composition,
    wherein the non-curable polymer is present in an amount of 1 to 20 parts by weight, with respect to the total weight of the composition, and wherein the polymerization initiator is present in an amount of 0.5 to 10 parts by weight, with respect to the total weight of the composition, wherein the composition exhibits a degree of curing shrinkage at a temperature of 20° C., of 7% to 13% measured according to Formula 1:

curing shrinkage (%)={(Vi−Vf)/Vi}·100={((m/ρi)−Vf)/(m/ρi)}·100,  Formula (1):

wherein Vi refers to a volume of the protective layer composition prior to the curing thereof, Vf refers to a volume of the protective layer composition after the curing thereof, m refers to a weight of the protective layer composition, and ρi refers to density of the protective layer composition prior to the curing thereof.

2. The composition of claim 1, wherein the compound including the functional group having the ethylenically unsaturated bond is an acrylic compound, a vinylic compound or combinations thereof.

3. The composition of claim 1, wherein the compound including the functional group having the ethylenically unsaturated bond is at least one selected from a group consisting of compounds represented by the following Chemical Formulae:

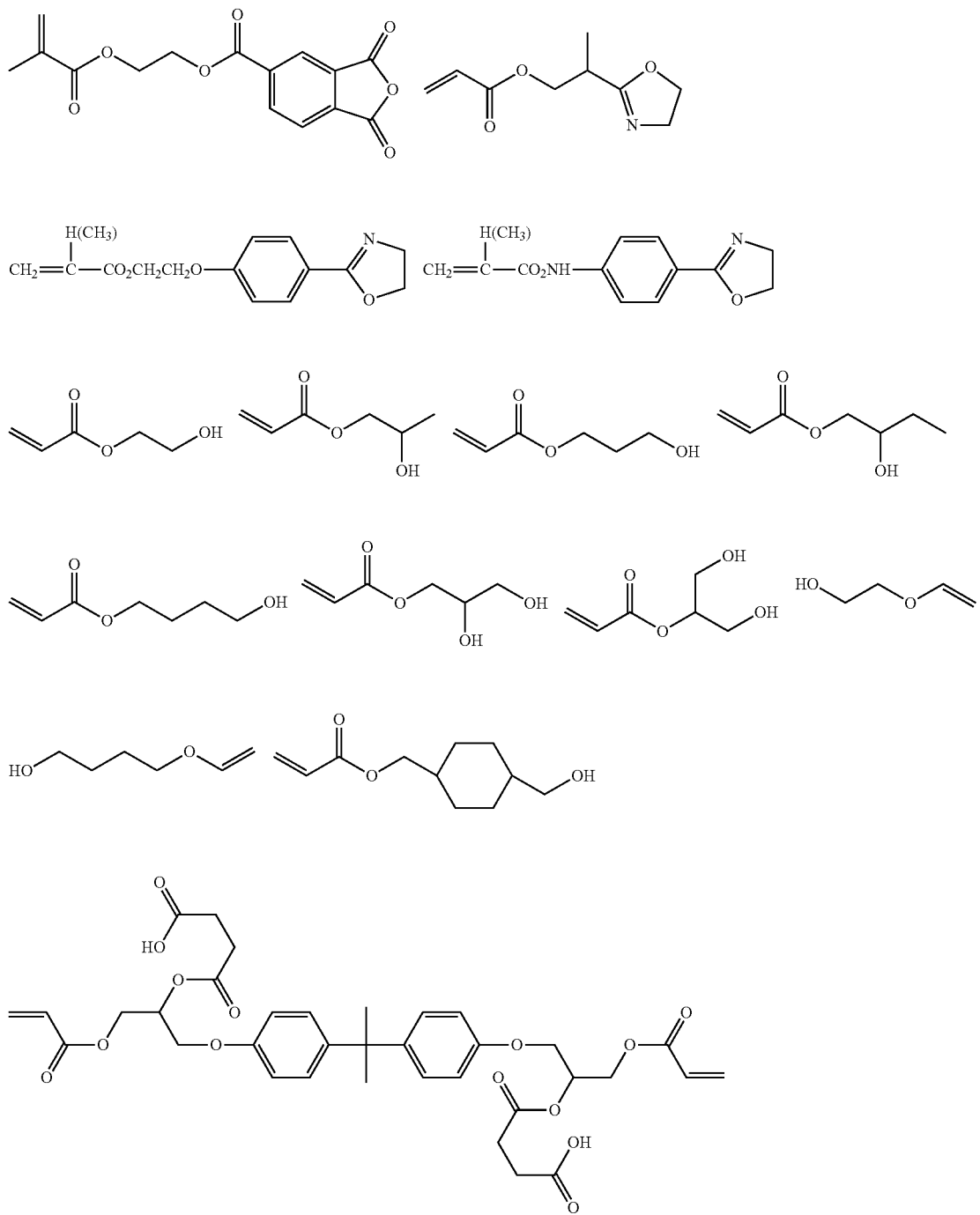

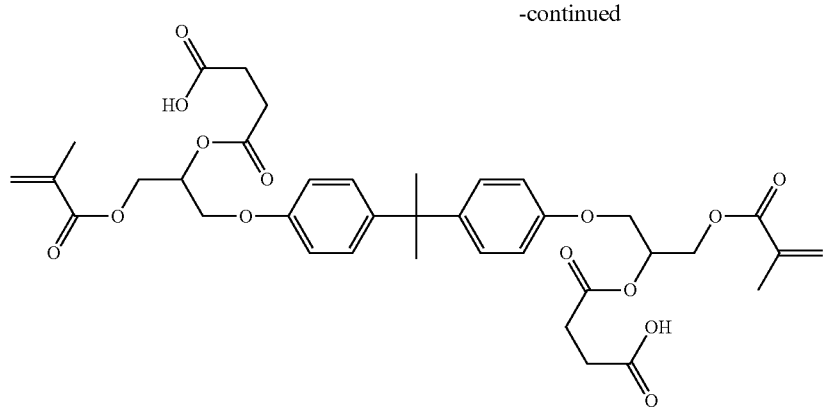
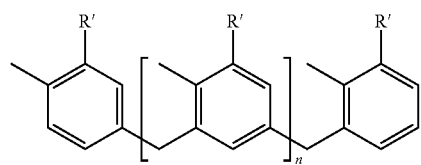
(where, R' is
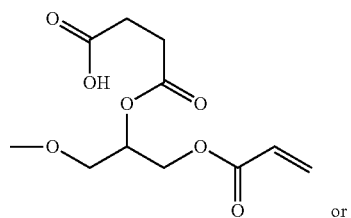 or 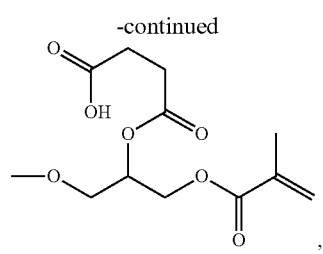
and n is an integer of 1 to 5)
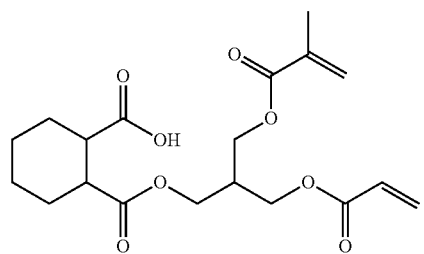
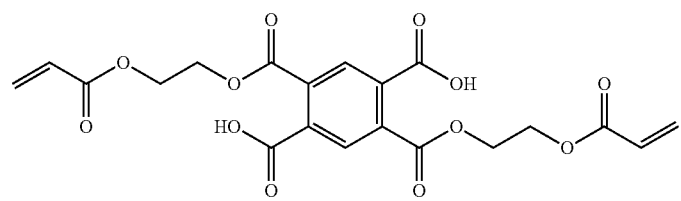
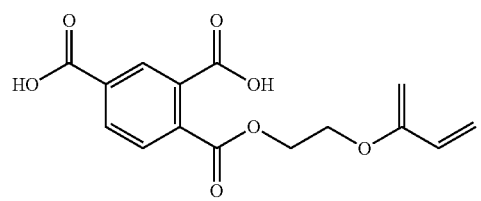
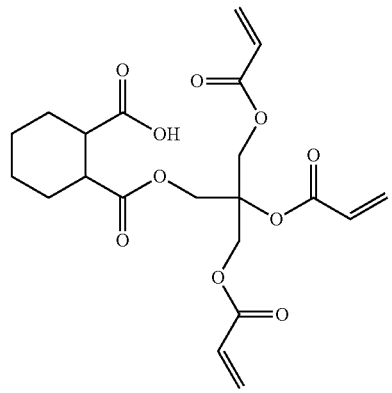

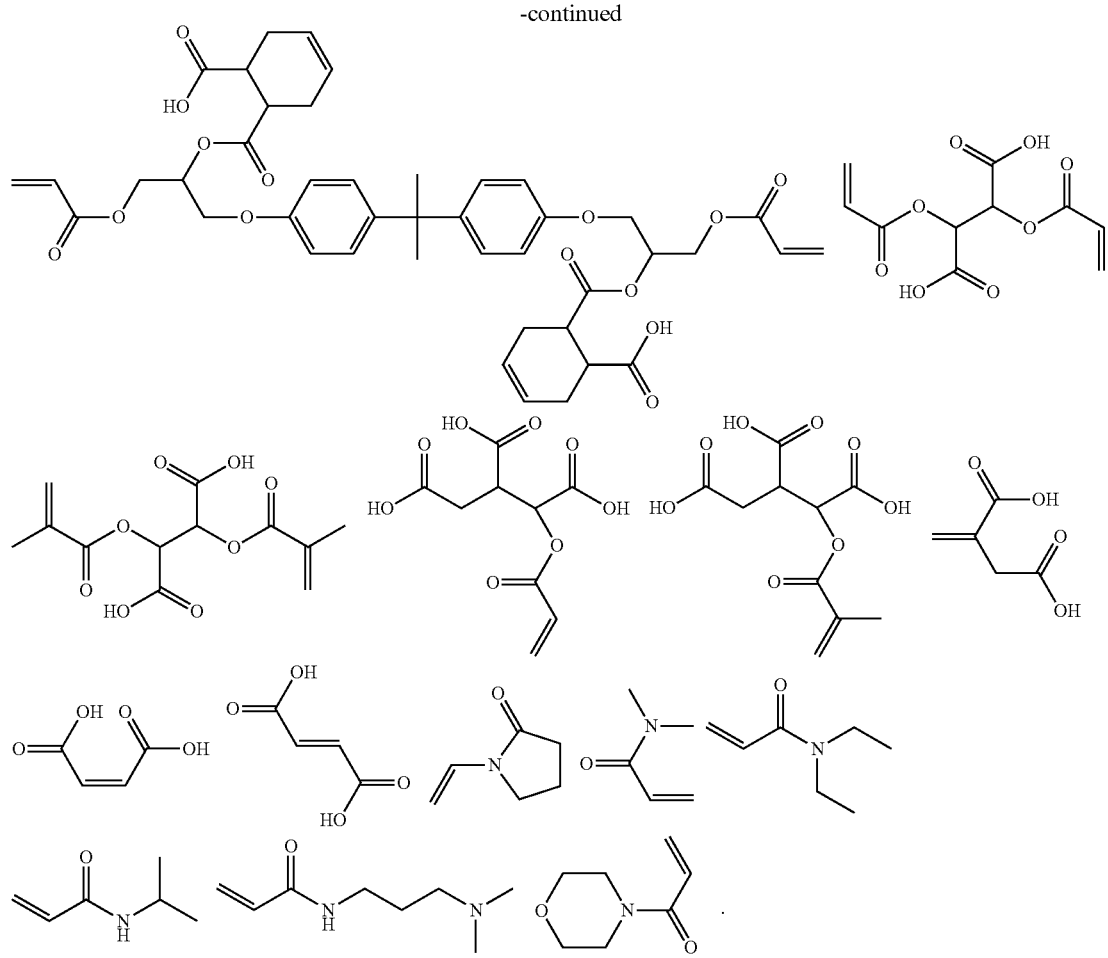

4. The composition of claim 1, wherein the ring-opening polymerizable compound is an epoxy compound, an oxetane compound or combinations thereof.

5. The composition of claim 1, wherein the non-curable polymer including the functional group containing at least one of O, N and F atoms in the side chain thereof is at least one selected from a group consisting of a vinyl alcohol-based polymer or copolymer, a acrylic acid-based polymer or copolymer, a vinyl pyrrolidone-based polymer or copolymer, a vinyl acetate-based polymer or copolymer, an amide-based polymer or copolymer, a vinylidene fluoride-based polymer or copolymer, and a urethane-based polymer or a copolymer.

6. The composition of claim 1, wherein the polymerization initiator is a cationic polymerization initiator, a radical polymerization initiator, or combinations thereof.

7. The composition of claim 1, wherein a viscosity of the composition is 30 cP to 500 cP.

8. The composition of claim 1, wherein the curable compound comprises two or more compounds mixed with each other.

9. The composition of claim 8, wherein the curable compound comprises a combination of an acrylamide-based compound and an acrylate-based compound including the functional group, or a combination of a vinyl pyrrolidone-based compound and an acrylate-based compound including the functional group.

10. The composition of claim 1, wherein the curable compound is present in an amount of 80 to 98.5 parts by weight, with respect to the total weight of the composition for the polarizing plate protective layer.

11. The composition of claim 1, wherein the curable compound is present in an amount of 77 to 92 parts by weight, with respect to the total weight of the composition for the polarizing plate protective layer, and wherein the polymerization initiator is present in an amount of 3 to 5 parts by weight, with respect to the total weight of the composition for the polarizing plate protective layer.

12. The composition of claim 7, wherein the composition exhibits a viscosity of 55 cP to 250 cP.

13. The composition of claim 1, wherein the curable compound is present in an amount of 70 to 92 parts by weight, with respect to the total weight of the composition, and wherein the non-curable polymer is present in an amount of 5 to 20 parts by weight with respect to the total weight of the composition.

14. A polarizing plate comprising: a polarizer; and a protective layer formed on at least one surface of the polarizer, wherein the protective layer is formed from a composition that, after curing, the protective layer exhibits a single glass transition temperature, the composition comprising:
a curable compound, a non-curable polymer, and a polymerization initiator,
the curable compound being at least one selected from a group consisting of a compound including a functional group selected from a group consisting of a hydroxyl group, an amine group, an amide group, a urethane group, a carboxyl group, an acid anhydride group, an oxazoline group, and a fluorine group and comprising an ethylenically unsaturated bond, and a ring-opening polymerizable compound, and the non-curable polymer including a functional group containing at least one of O, N and F atoms in a side chain thereof, wherein the curable compound is present in an amount of 70 to 98.5 parts by weight, with respect to the total weight of the composition, wherein the non-curable polymer is present in an amount of 1 to 20 parts by weight, with respect to the total weight of the composition, and wherein the polymerization initiator is present in an amount of 0.5 to 10 parts by weight, with respect to the total weight of the composition, wherein the curable compound and the non-curable compound are in a hydrogen-bonded state in the protective layer;

wherein the composition exhibits a degree of curing shrinkage at a temperature of 20° C., of 7% to 13% measured according to Formula 1:

$$\text{curing shrinkage } (\%) = \{(V_i - V_f)/V_i\} \cdot 100 = \{((m/\rho i) - V_f)/(m/\rho i)\} \cdot 100, \quad \text{Formula (1):}$$

wherein Vi refers to a volume of the protective layer composition prior to the curing thereof, Vf refers to a volume of the protective layer composition after the curing thereof, m refers to a weight of the protective layer composition, and ρi refers to density of the protective layer composition prior to the curing thereof.

15. The polarizing plate of claim 14, wherein the single glass transition temperature is 60° C. to 200° C.

16. The polarizing plate of claim 14, further comprising: a protective film attached to a surface of the polarizer, opposite to the surface thereof on which the protective layer is formed, via an adhesive layer.

17. The polarizing plate of claim 16, wherein the protective film is a cellulose film, a polyethylene terephthalate (PET) film, a cycloolefin polymer (COP) film, or an acrylic film.

18. The polarizing plate of claim 14, further comprising: a bonding layer formed on the protective layer.

19. A display device comprising: the polarizing plate of claim 14.

20. The polarizing plate of claim 14, further comprising a bonding layer disposed on a portion of the protective layer.

21. The polarizing plate of claim 14, wherein the single glass transition temperature is 80° C. to 103° C.

* * * * *